United States Patent
Nagata et al.

(10) Patent No.: US 8,097,231 B2
(45) Date of Patent: *Jan. 17, 2012

(54) METHOD AND SYSTEM FOR PRODUCING ACTIVATED CARBON

(75) Inventors: Masayoshi Nagata, Kanagawa (JP); Ryou Takeda, Kanagawa (JP); Noboru Ishibashi, Kyoto (JP); Kazuyoshi Yamamoto, Kyoto (JP); Yoshio Hara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 12/324,946

(22) Filed: Nov. 28, 2008

(65) Prior Publication Data

US 2009/0142252 A1 Jun. 4, 2009

(30) Foreign Application Priority Data

Nov. 30, 2007 (JP) ................... 2007-309670

(51) Int. Cl.
*B29D 7/00* (2006.01)
*C01B 31/08* (2006.01)
*C01B 31/00* (2006.01)
*D01F 9/16* (2006.01)

(52) U.S. Cl. ................. 423/447.9; 423/445 R; 264/217; 502/416

(58) Field of Classification Search .................. None
See application file for complete search history.

(56) References Cited

FOREIGN PATENT DOCUMENTS

| JP | 07-172808 | 7/1995 |
|---|---|---|
| JP | 11-171524 | 6/1999 |
| WO | 2008/090938 A1 | 7/2008 |

*Primary Examiner* — Melvin Mayes
*Assistant Examiner* — Guinever Gregorio
(74) *Attorney, Agent, or Firm* — Sughrue Mion, PLLC

(57) ABSTRACT

An activated carbon producing system includes a carbonizer for carbonizing cellulose triacetate as cellulose acylate to create carbonized material. A pulverizer pulverizes the carbonized material to obtain granules. An activation device activates the granules to create activated carbon. The activated carbon producing system includes a dispenser for supplying the cellulose triacetate at a plural number of times. A heating furnace is operated at each time after the dispenser operates, for thermally decomposing the cellulose triacetate from the dispenser, to obtain the carbonized material by carbonization. The pulverizer pulverizes the carbonized material in a size equal to or more than 2 mm and equal to or less than 20 mm. Temperature of the heating furnace is equal to or higher than 300 deg. C. and equal to or lower than 600 deg. C.

11 Claims, 5 Drawing Sheets

METHOD AND SYSTEM FOR PRODUCING ACTIVATED CARBON

BACKGROUND OF THE INVENTION

1. Field of the Invention

The present invention relates to a method and system for producing activated carbon. More particularly, the present invention relates to a method and system for producing activated carbon, in which cellulose acylate can be utilized as raw material, and the activated carbon with high adsorptivity can be produced.

2. Description Related to the Prior Art

Polymer films have excellent optical transmittance and flexibility and are capable of forming thin and lightweight films. Owing to this, the polymer films are widely used as optical functional films. In particular, a cellulose acylate film formed of cellulose acylate and the like has toughness and low birefringence in addition to those properties. The film is used as a protection film for a polarizing filter incorporated in a panel, namely, a liquid crystal display (LCD) whose market is recently expanding.

In a polarizing filter production process to produce polarizing filters, approximately 30% of the total amount of supplied films is discarded. The discarded films or waste films are rapidly increasing in accordance with rapid market expansion of the polarizing filters. However, reuse and recycle systems have not been developed for the waste films in comparison with a reuse system of wastepaper and a recycle resin forming system of waste plastics. Waste films are burned or disposed of in landfills at additional waste-processing expense.

However, reuse of the waste films is desired from the viewpoint of recent environmental problems and saving of resources. As methods to reuse the waste films, there are a method to selectively isolate cellulose acylate which is the raw material of the films from the waste films, a method in which the waste films are used as raw materials for molding, and the like. However, in the former method, it is difficult to selectively isolate only the cellulose acylate from the waste films, because several additives contained in the waste films by the film production are extremely difficult to remove. In the latter method, the waste films cannot be used as the raw material for molding. This is because the glass transition point of the cellulose acylate is near to its decomposition point. Cellulose acylate characteristically starts decomposition at the same time as melting.

JP-A 11-171524 discloses a method which reuses wastepaper such as old newspaper and the like as a raw material of activated carbon. However, in many cases, carbonized materials generated by carbonization of waste materials do not have high adsorption property due to the above reasons. Accordingly, most of such carbonized materials are used as soil improvement agents, fuels or the like, but not as adsorbents.

Furthermore, JP-A 7-172808 discloses a method which reuses phenol resin-based wastes as raw materials of activated carbon. There is a known process of decomposing cellulose acylate by application of heat.

WO 2008/090938 discloses a method of processing activated carbon with high adsorptivity from organic material containing cellulose acylate as a main component.

However, only powdered activated carbon is available according to the disclosure of WO 2008/090938. A well-known utilization of the powdered activated carbon is to add the powdered activated carbon in liquid together with compounds such as dyes or raw material before chemical reaction, and to stir the liquid as dispersion or the like, for discoloring of the above various compounds and adsorption of impurity. A preferable system in which the powdered activated carbon is used is a batch system. However, there are other suitable uses of the granular activated carbon which are different from the uses of the powdered activated carbon. For example, the granular activated carbon is suitably used in a known adsorption device for adsorbing solvent with steam by use of activated carbon as gaseous solvent evaporated in the course of solution casting of the cellulose acylate film.

This is because the powdered activated carbon is more difficult to handle than granular activated carbon. The powdered activated carbon may flow away or scatter in an accidental manner, for example, during placement in an adsorption device, during use for adsorption, during desorption by use of steam, and the like. The surface area per unit volume is larger according to the smallness in the granule diameter. The state of containing the activated carbon is tight in a chamber in the adsorption device owing to the powdered form. It is impossible to keep a passage space for gaseous substance to be adsorbed, for example, gaseous solvent in a solution casting system. There arise several problems in the use of the granules with a small diameter in comparison with granules obtained from powdered activated carbon by attachment with binder. A problem lies in the insufficient area of contact of the activated carbon with material to be adsorbed. Also, an unwanted increase in the resistance to the passage of the material to be adsorbed is likely to occur.

Examples of binders of attaching the powdered activated carbon in a granular form include PVA, cornstarch, petroleum pitch, and the like. However, the granular activated carbon formed by use of PVA or cornstarch has low resistance to solvent and low resistance to heat, and are unsuitable in an adsorption device in a solution casting system. This is because the granular activated carbon is degraded or broken by contact with solvent to be adsorbed or steam used for desorption. In contrast, the granular activated carbon formed by use of petroleum pitch has high resistance to solvent and high resistance to heat. However, there is a problem in the use of petroleum pitch as harm to the environment in comparison with the use of PVA or cornstarch.

SUMMARY OF THE INVENTION

In view of the foregoing problems, an object of the present invention is to provide a method and system for producing activated carbon, in which cellulose acylate can be utilized as raw material, and the activated carbon with high adsorptivity can be produced.

In order to achieve the above and other objects and advantages of this invention, an activated carbon producing method is provided, and includes a carbonizing step, having supply periods and decomposing periods, wherein in a plural number of the supply periods, the cellulose acylate is supplied to a heating furnace, and the decomposing periods are set respectively after the supply periods, for melting and thermally decomposing the cellulose acylate in the heating furnace, to obtain the carbonized material. In a cooling step, the carbonized material is cooled. In a pulverizing step, the carbonized material is pulverized to obtain granules. In an activating step, the granules are activated to create activated carbon, by forming fine pores in the granules with heat applied to the granules in presence of gaseous oxidant for oxidating the carbonized material.

In the decomposing period of a second sequence or later, the carbonized material produced earlier is permeated with melt of the cellulose acylate.

An Nth one of the supply periods is started while gas of the carboxylic acid is created in an (N−1)th one of the decomposing periods, where N is an integer of 2 or more.

Carboxylic acid density of carboxylic acid present in the heating furnace becomes higher during carbonization. Furthermore, after the decomposing periods of the plural number, the carboxylic acid density in the heating furnace is detected. When the carboxylic acid density becomes higher than a peak, the carbonizing step is terminated to start the cooling step.

The Nth supply period is started when the carboxylic acid density becomes equal to or less than D % of a peak thereof in the (N−1)th decomposing period, and D is equal to or less than 60.

The plural number is at least three.

In the pulverizing step, the carbonized material is pulverized in a size equal to or more than 2 mm and equal to or less than 20 mm.

Furthermore, there is a cutting step of cutting film of the cellulose acylate into chips for supply to the heating furnace.

Temperature of the heating furnace is equal to or higher than 300 deg. C. and equal to or lower than 600 deg. C.

In the decomposing period, the cellulose acylate is heated in a duration equal to or more than 15 minutes and equal to or less than 60 minutes.

Furthermore, there is a classifying step of classifying the granules before the activating step.

In one preferred embodiment, an activated carbon producing system is provided, and includes a carbonizer for carbonizing cellulose acylate to create carbonized material, a pulverizer for pulverizing the carbonized material to obtain granules, and an activation device for activating the granules to create activated carbon. The carbonizer includes a dispenser for supplying the cellulose acylate at a plural number of times. A heating furnace is operated at each time after the dispenser operates, for melting and thermally decomposing the cellulose acylate from the dispenser, to obtain the carbonized material.

Furthermore, a cooler cools the carbonized material from the carbonizer. The activation device creates the activated carbon by use of gaseous oxidant and heat.

In a second one of the decomposing periods or later, the carbonized material produced earlier is permeated with melt of the cellulose acylate.

An Nth supply period of the dispenser is started while gas of the carboxylic acid is created in an (N−1)th decomposing period of the heating furnace, where N is an integer of 2 or more.

Carboxylic acid density of carboxylic acid present in the heating furnace becomes higher during carbonization. Furthermore, a density sensor, after the decomposing periods of the plural number in the heating furnace, detects the carboxylic acid density in the heating furnace. When the carboxylic acid density becomes higher than a peak, the heating furnace is made inactive, and the carbonized material is transferred to the cooler.

The Nth supply period is started when the carboxylic acid density becomes equal to or less than D % of a peak thereof in the (N−1)th decomposing period, and D is equal to or less than 60.

Consequently, the activated carbon with high adsorptivity can be produced by utilizing cellulose acylate as raw material, because of the repeated sequences of supply periods and decomposing periods in the carbonizing step.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Carbonaceous raw material of the activated carbon in the present invention is cellulose acylates, and can be in a film form by way of industrial wastes. Materials of the film form may be a single layer waste film and a multi-layer waste film, the single layer waste film being formed to include one layer of cellulose acylate, the multi-layer waste film being formed to include plural layers with at least one layer of cellulose acylate. Cellulose acylates as a main component of the film are cellulose triacetate (TAC) and also can be cellulose diacetate (DAC), tripropyl cellulose and the like. The degree of substitution of the acyl groups, specific examples of acyl groups and the like are not limited particularly. Note that the term of the main component is used to mean one of the components in the film having the greatest ratio of weight.

Details of cellulose acylates are according to various relevant techniques suggested in JP-A 2005-104148. Those examples and their various features can be used in the present invention. Uses of various materials in relation to the polymer are suggested in JP-A 2005-104148, including solvents, plasticizers, deterioration inhibitors, ultraviolet (UV) absorbers, lubricants, optical anisotropy control agents, retardation control agents, dyes, mat agents, release agents, stripping accelerators, and other additives. The cellulose acylates of the invention may contain any of those additives.

Figure 1A:
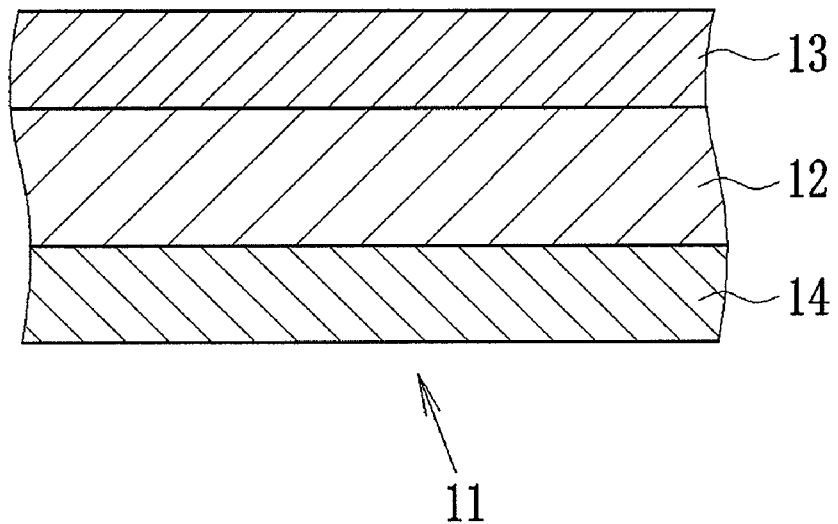
FIG. 1A is a cross section illustrating a multi-layer waste film as carbonaceous raw material.
Figure 1B:
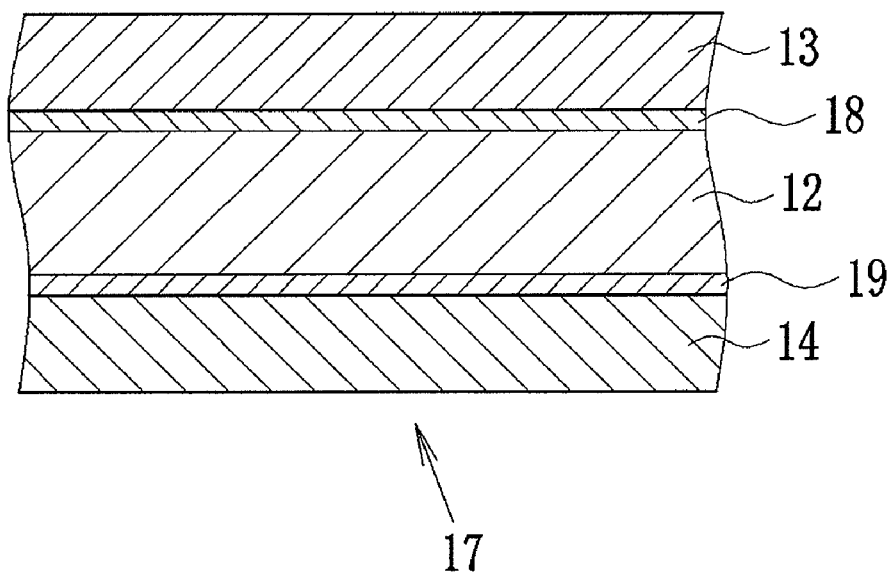
FIG. 1B is a cross section illustrating another multi-layer waste film.

The method of producing activated carbon from the multi-layer waste film is described now. In FIGS. 1A and 1B, examples of multi-layer waste films as raw materials are illustrated. Common reference numerals are used between those drawings. A multi-layer waste film 11 of FIG. 1A includes a PVA layer 12 and cellulose ester layers 13 and 14 of cellulose acylate. The PVA layer 12 is formed from polyvinyl alcohol. The cellulose ester layers 13 and 14 are overlaid on respectively surfaces of the PVA layer 12. Each of the PVA layer 12, the cellulose ester layers 13 and 14 is an element originally produced as a single layer film product of PVA or cellulose ester. The multi-layer waste film 11 is formed by attaching those together in adhesion. The producing method of the PVA film and cellulose ester film for use in the present invention is not limited.

Iodine may be contained in the PVA layer 12 as additive for use in a polarizing plate. The cellulose ester layers 13 and 14 are basically the same as those contained in the single layer waste film. Also, each of the cellulose ester layers 13 and 14 may contain various compounds such as plasticizer, ultraviolet (UV) absorber, and other additives, and retardation control agents. The cellulose ester layer 14 may have components and a ratio of composition of those in an equal manner to the cellulose ester layer 13, and may have components and a ratio of composition of those in a different manner from the cellulose ester layer 13. Cellulose acylate may be different between the cellulose ester layers 13 and 14 in relation to examples of acyl groups and substitution degree of the acyl groups.

In FIG. 1B, a multi-layer waste film 17 is illustrated. An adhesive layer 18 is disposed between the cellulose ester layer 13 and the PVA layer 12. An adhesive layer 19 is disposed between the cellulose ester layer 14 and the PVA layer 12. Both of those operate for firm adhesion of the layers.

When the multi-layer waste films 11 and 17 are used as polarizing plate, the PVA layer 12 is a polarizing element. The cellulose ester layers 13 and 14 are protective layers for protecting the polarizing element. Examples of the multi-layer waste films 11 and 17 for activated carbon include remaining portions after cutting portions of polarizing plates from a continuous multi-layer film which includes a PVA layer and first and second cellulose acylate layers, and also defective portions derived from produced polarizing plates according to quality inspection, and the like. An example in the embodiment is the use of the multi-layer waste films 11 and 17 in layer structure of PVA and cellulose acylate as raw material of activated carbon. However, the invention is not limited to this structure. Another example is a combined use of the single layer film of PVA and the single layer film of cellulose acylate. This occurs when an unwanted portion remains after cutting in a single layer form in the process of producing the polarizing plate.

Figure 2:
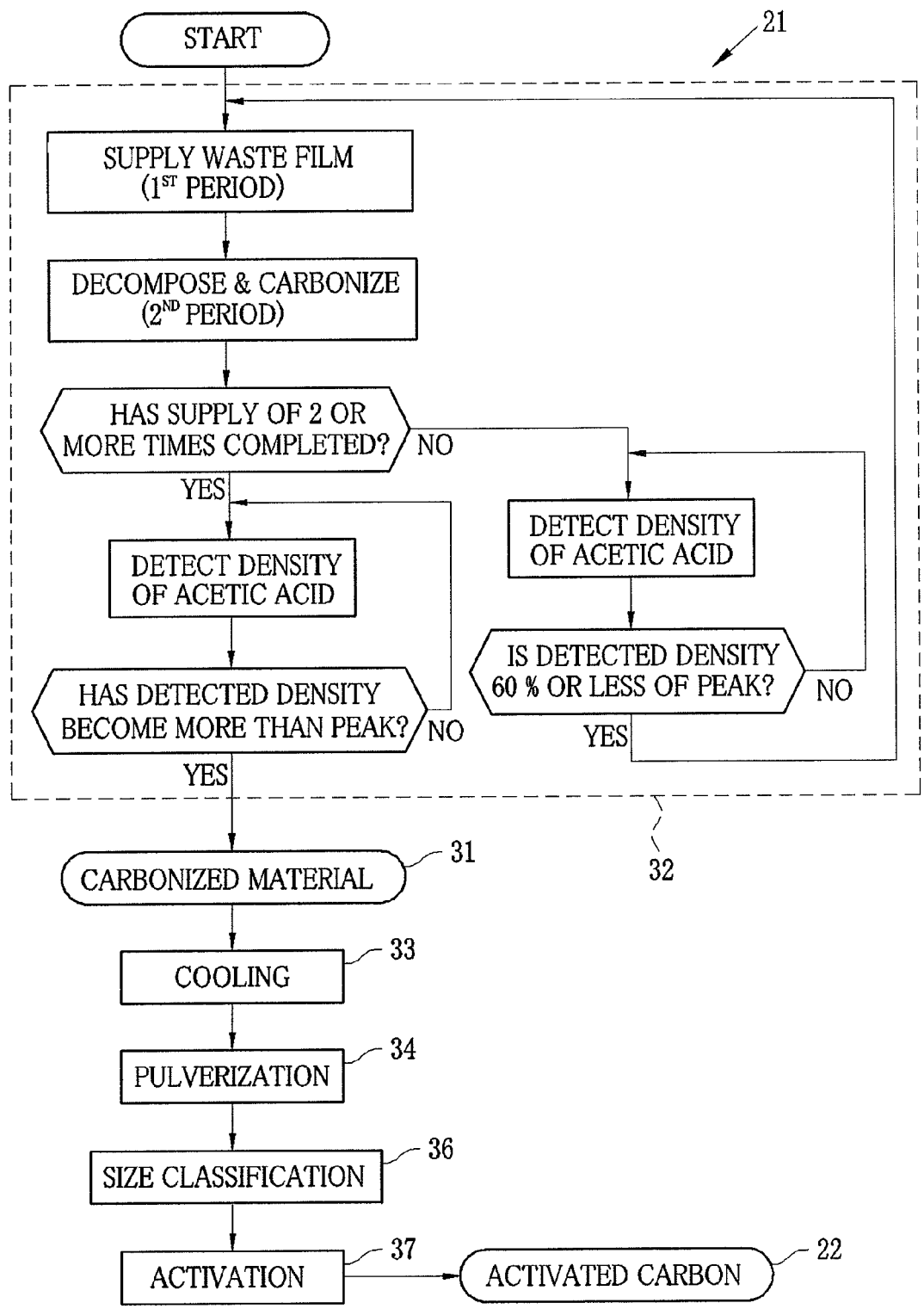
FIG. 2 is a flow chart illustrating an activated carbon producing method.

In FIG. 2, a flow of production of activated carbon of the invention is illustrated. The producing process is the same in using any one of the single layer waste film and multi-layer waste film of FIG. 1A or 1B. In the following description, activated carbon 22 is produced by use of the multi-layer waste film 17 of FIG. 1B as carbonaceous raw material.

An activated carbon producing method 21 includes a carbonizing step 32, a cooling step 33 and a pulverizing step 34. In the carbonizing step 32, heat is applied to chips of multi-layer waste film or the like, to form carbonized material 31 by decomposition and carbonization. In the cooling step 33, the carbonized material 31 is cooled. In the pulverizing step 34, the carbonized material 31 is pulverized. Examples of cooling methods in the cooling step 33 can be forced cooling by use of a cooler, or natural cooling by heat dissipation. The cooling step 33 is effective in facilitating pulverization of the carbonized material 31 in the pulverizing step 34.

There is considerable irregularity in the granule diameter of the carbonized material 31 obtained in the pulverizing step 34. In other words, distribution of the granule diameter is very large. It is generally preferable that the granule diameter of the activated carbon is approximately constant in consideration of specific purposes of activated carbon. Accordingly, a size classifying step 36 is additionally used for classifying the carbonized material 31 according to the granule diameter. Then an activating step 37 is supplied with the carbonized material 31 after size classification in the size classifying step 36 for plural ranges of the granule diameter, to activate the carbonized material 31. The activation in the activating step 37 is to apply heat to the carbonized material 31 in order to form numerous fine pores. Activated carbon 22 is obtained in the activating step 37. Note that the size classifying step 36 may be eliminated. The carbonized material 31 from the pulverizing step 34 can be processed in the activating step 37 simply without the size classifying step 36 for the purpose of forming the activated carbon 22.

If the cellulose acylate in the multi-layer waste film 17 is cellulose acetate, pyrolysis gas 27 of acetic acid $CH_3COOH$ is produced in the carbonizing step 32. As the multi-layer waste film 17 is derived from the polarizing plate production, iodine is contained in the PVA layer in the multi-layer waste film 17. Then in the carbonizing step 32, at least one of iodine and iodine oxides is created in addition to the acetic acid. Therefore, the pyrolysis gas 27 contains iodine or iodine oxides. It is preferable to use a known method of removing acetic acid, iodine and iodine oxides from mixed gas. The pyrolysis gas 27 can be cleaned by use of the method before discharge in the atmosphere.

Figure 3:
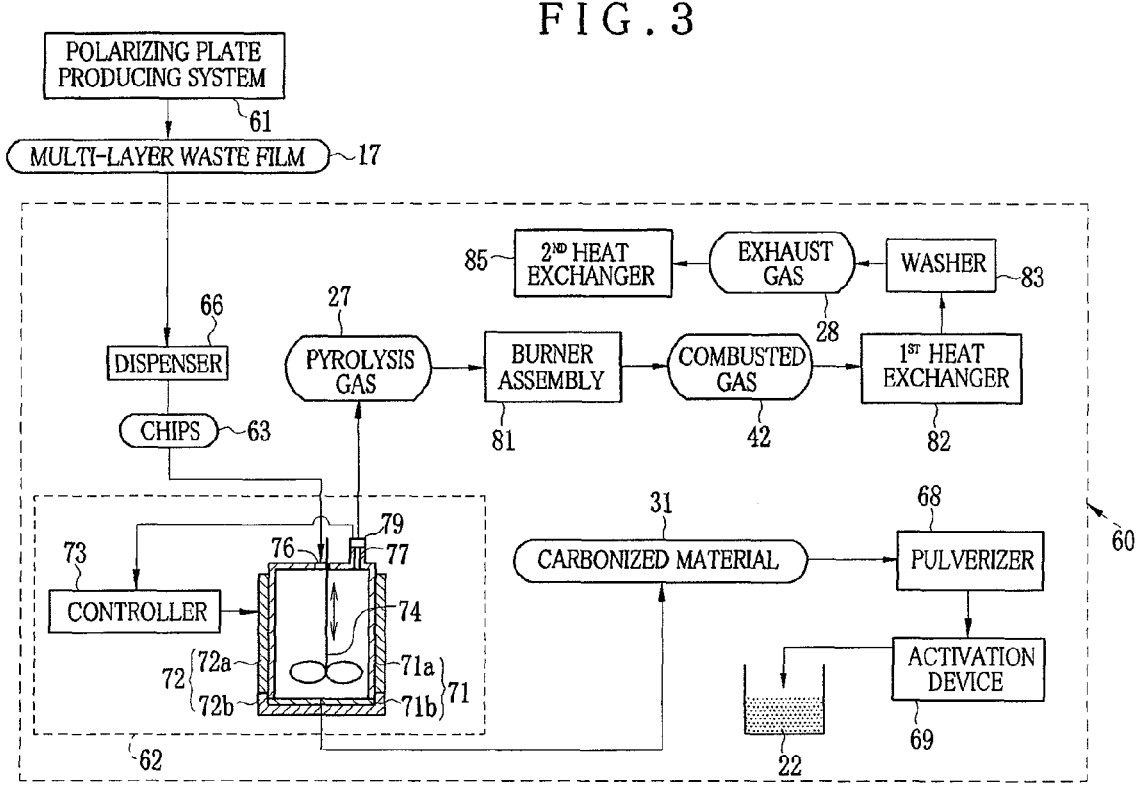
FIG. 3 is a block diagram illustrating an activated carbon producing system.
Figure 4A:
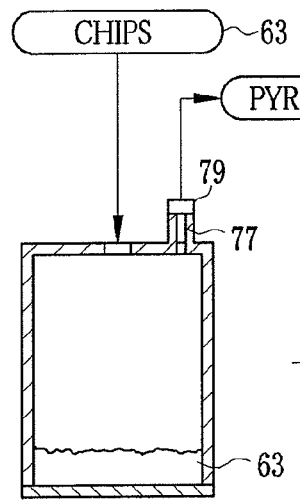
FIG. 4A is an explanatory view illustrating a state of a heating furnace in a first sequence of carbonization.
Figure 4B:
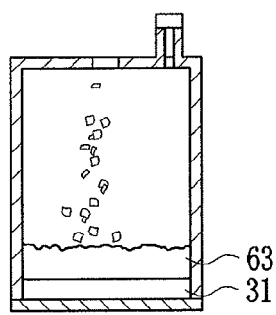
FIG. 4B is an explanatory view illustrating a state of the heating furnace in a supply period of a second sequence of carbonization.
Figure 4C:
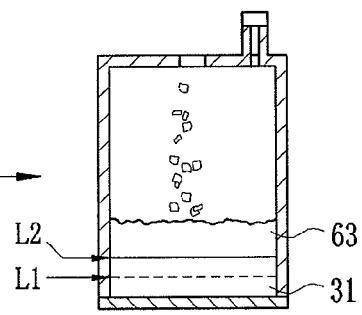
FIG. 4C is an explanatory view illustrating a state of the heating furnace in a supply period of a third sequence of carbonization.

In FIG. 3, an activated carbon producing system 60 is illustrated. In FIGS. 4A-4C, a carbonizer 62 is illustrated. The activated carbon producing system 60 includes a dispenser 66, the carbonizer 62, a pulverizer 68, and an activation device 69. The dispenser 66 forms chips 63 by cutting the multi-layer waste film 17 as raw material from a polarizing plate producing system 61. The carbonizer 62 carbonizes the chips 63 from the dispenser 66 to obtain the carbonized material 31. The pulverizer 68 pulverizes the carbonized material 31 to form granules, which are classified by size classification. The activation device 69 activates the carbonized material 31 of granules to obtain the activated carbon 22. Carbonization in the present invention is pyrolysis to decompose carbonaceous material thermally to obtain a product generally constituted by carbon atoms.

The dispenser 66 includes a rotary cutter, hopper and batch feed mechanism (not shown). The rotary cutter has a blade. The hopper is disposed in an upstream end of the rotary cutter. The batch feed mechanism feeds the chips 63 from the rotary cutter toward the carbonizer 62.

The multi-layer waste film 17 is entered in the hopper, and transferred to the rotary cutter. There is no need of a predetermined form of the multi-layer waste film 17 before entry to the hopper. Examples of forms of the multi-layer waste film 17 are a ribbon shape, a sheet shape, and a strip shape and a mixture of those. The multi-layer waste film 17 is cut by the rotary cutter into the chips 63 of a nearly quadrilateral shape of 1 cm×1 cm. The batch feed mechanism is disposed downstream from the rotary cutter, and transfers the chips 63 to the carbonizer 62. Note that cutting of the multi-layer waste film 17 into the chips 63 is unnecessary. The multi-layer waste film 17 can be supplied to the carbonizer 62 in an original shape. However, cutting of the multi-layer waste film 17 into the chips 63 is preferable in consideration of efficiency and effectiveness in carbonization in the carbonizer 62 and facilitating adjustment of an amount to be supplied to the carbonizer 62.

The carbonizer 62 includes a heating furnace 71, a heater/cooler 72 and a controller 73. The heating furnace 71 is supplied with the chips 63 to carbonize. The heater/cooler 72 heats and cools the inside of the heating furnace 71 for keeping a constant inner temperature. The controller 73 controls the heater/cooler 72 for the temperature.

The heating furnace 71 includes a furnace lining 71a or furnace body and a furnace bottom 71b. The furnace lining 71a contains the chips 63. The furnace bottom 71b is secured to the edge of the furnace lining 71a in a removable manner. A supply opening 76 and an exit opening 77 are formed in an upper side of the furnace lining 71a. The supply opening 76 is openable and adapted for feeding the chips 63. The exit opening 77 is openable, and exhausts the gas within the furnace lining 71a. A density sensor 79 is disposed at the exit opening 77 for detecting density of acetic acid in the pyrolysis gas 27. The density sensor 79 sends a signal to the controller 73 as a result of detecting the density at the exit opening 77. In response to the signal, the controller 73 turns on or off the heating of the heater/cooler 72, or adjusts the target temperature.

The heater/cooler 72 includes a first cover 72a and a removable second cover 72b. The first cover 72a covers the outside of the furnace lining 71a. The second cover 72b is removably positioned on the first cover 72a at the time of removal of the furnace bottom 71b from the furnace lining 71a. Examples of the heater/cooler 72 include a type with an electric heater, a burner heating type and the like, which are selective or combined together suitably. Heating of the chips 63 may be indirect by use of the furnace lining 71a in the present embodiment, or may be direct for the chips 63. The cooler in the heater/cooler 72 may be any of well-known types, for example, in circulation of air flow, coolant or the like. A mixer 74 may be disposed inside the furnace lining 71a for stirring the chips 63 during the heating. The carbonization can be carried out efficiently and uniformly. It is possible to use a fan or blower for applying a flow of air to the chips 63 in the heating furnace 71 for agitation, in place of or in addition to the mixer 74. In FIG. 4, the mixer 74 is not illustrated for the purpose of simplicity.

The chips 63 are carbonized not in a collective manner but in batches of a divided manner. In a plurality of sequences, the chips 63 are fed in batches, and then carbonized each time after the supply. In the present description, a term of a supply period is used as a first period of supply of the chips 63 to the furnace lining 71a. A term of a decomposing period is used as a second period of decomposing the chips 63 for carbonization after the supply. Specifically, a first batch of the chips 63 is fed in the furnace lining 71a as first supply. Before the completion of the carbonization of the chips 63 of the first supply, a second batch of the chips 63 is fed in the furnace lining 71a with the carbonized material 31 formed by the first supply.

A method of carbonization at one time by feeding the entirety of the material to be carbonized in the heating furnace 71 may be preferable solely in view of speed and efficiency. However, only the carbonized material with a low rigidity can be obtained due to occurrence of a great amount of acetic acid in the carbonization at one time. This is because abrupt occurrence of a great amount of acetic acid creates bubbles in the chips 63 which is made viscous or fluid by heating. At the end of the carbonization, the carbonized material will be numerous pieces of films with a small thickness. When this carbonized material is activated, it is likely that obtained granular activated carbon will be easily collapsible in powder upon application of weight, or that only the powdered activated carbon of a small diameter will result without granules. In the present invention, the supply and decomposing periods in the carbonizing step are set alternately and repeatedly, to create the acetic acid very gradually in comparison with the carbonization at one time. Bubbles of acetic acid in the chips 63 being decomposed will be very fine. Thus, the carbonized material 31 of a tight property is formed, and can be very hard in comparison with that obtained by carbonization at one time. As a result, the activated carbon 22 formed in this manner from the carbonized material 31 can have a very high hardness. The activated carbon 22 will not collapse readily even upon application of weight, and will maintain its original granule diameter when contained in an adsorption device in a solution casting system. The activated carbon 22 can have originally high resistance to steam, because of high hardness against degradation even after a sequence including the adsorption and desorption with steam in the solution casting system.

Note that the hardness of granules of the activated carbon 22 can be evaluated by measuring their resistance to weight. In the evaluation, granules are sampled by consideration of a predetermined range of the granule diameter. Load of weight is applied to the sampled granules to check whether they collapse or not. The weight to the sampled granules is changed, to monitor a level of the maximum weight at which they are short of collapsing. This resistance is used as degree of hardness of granules of the activated carbon 22. Note that other methods may be used for evaluating hardness of the granules.

The following is a specific example of the carbonization including two periods. In FIG. 4A, part of the chips 63 to be carbonized is supplied to the heating furnace 71. This is a supply period of the first sequence.

Then in the decomposing period of the first sequence, the chips 63 of the first supply are carbonized. It is preferable to stir the chips 63 by rotation of the mixer 74 in FIG. 3. The chips 63 are heated and decomposed, to carbonize the PVA, cellulose acylate and adhesive agent by thermal decomposition. The cellulose acylate decomposes in the chips 63. At the start of the decomposition, acetic acid is created in a gas phase. The exit opening 77 is kept open in the decomposing period, to draw the pyrolysis gas 27 containing the gaseous acetic acid. If iodine, iodine ion and iodine oxides are created, any of those is drawn with the gaseous acetic acid in the pyrolysis gas 27. The cellulose acylate is carbonized when the single layer waste film is used as raw material. The cellulose acylate and PVA are carbonized when the multi-layer waste film is used as raw material.

At the exit opening 77, density of acetic acid in the pyrolysis gas 27 is detected continuously by the density sensor 79, to send a detection signal to the controller 73. The acetic acid density at first increases gradually after the start of carbonizing the first supply, and then comes to its peak, and then decreases gradually. If the acetic acid density remains low without rise over a predetermined level, then the controller 73 preferably can control the heater/cooler 72 to set the target temperature higher. This is effective in promoting decomposition to carry out carbonization efficiently.

A start of the supply period of the second sequence after completing the decomposition or after the decrease of the acetic acid density to zero is effective in raising hardness of the carbonized material 31, but is not very preferable in view of good productivity. In consideration of the sufficient hardness of the carbonized material 31 and the productivity, it is preferable to start the supply period of the second sequence in the course of producing acetic acid in the decomposing period of the first sequence. Thus, the activated carbon 22 of a granular form with high resistance to weight can be produced efficiently. Preferably, after peaking of the acetic acid density, the supply period of the second sequence is started. Should the supply period of the second sequence be started before peaking of the acetic acid density, an amount of the acetic acid produced in the decomposing period with the second supply may be excessive in addition to the amount of the acetic acid created by the first supply, to reduce the effect of repeating the supply and decomposing periods by splitting the amount of the raw material to be carbonized.

Thus, it is preferable in view of efficiency to start the supply period of the second sequence after peaking of the acetic acid density and before reach of the acetic acid density to zero. Furthermore, it is desirable to start the supply period of the second sequence when the acetic acid density becomes equal to or lower than a predetermined value after a gradual decrease of the acetic acid density from its peak. In short, it is preferable to terminate the decomposing period of the first sequence before completion of the carbonization. The start of the supply period of the second sequence can be determined according to an amount of acetic acid obtained per unit time, or more simply, according to the acetic acid density. It is specifically preferable to set the acetic acid density at the start of the supply period of the second sequence approximately 60% as high as a peak of the acetic acid density in the decomposing period of the first sequence. The supply period of an Nth sequence can be preferably started when the acetic acid density becomes 60/100 as high as a peak of the acetic acid density in the decomposing period of the (N−1)th sequence.

When the acetic acid density comes up to its peak and then decreases to become equal to or lower than a predetermined value, then the batch feed mechanism of the dispenser 66 can operate to feed the chips 63 for next supply period in response to a signal from the density sensor 79.

The carbonization in the decomposing period as decomposition is exothermic reaction, which generates heat. The acetic acid density is proportional to a heat amount. The acetic acid density increases at the same time as the heat amount increases. The acetic acid density decreases at the same time as the heat amount decreases. A start time of the supply period of the second sequence can be determined according to the detected temperature by monitoring changes in the temperature of the heating furnace 71 even without use of the density sensor 79. Thus, the start time of the supply period of an Nth sequence can be obtained according to the acetic acid density or temperature of the heating furnace 71 in the decomposing period of an (N−1)th sequence, where N is an integer of 2 or more. Specifically, the start time of the supply period of the second or third sequence can be obtained according to the acetic acid density or temperature of the heating furnace 71 in the decomposing period of respectively the first or second sequence.

In the supply period of the second sequence, as illustrated in FIG. 4B, the chips 63 of the second supply are newly supplied on the carbonized material 31 obtained by the decomposing period of the first sequence. It is preferable that an amount of the second supply is so high as to cause molten cellulose acylate to permeate pores in the carbonized material 31 upon decomposing the second supply in the decomposing period of the second sequence, the batch of the carbonized material 31 being created earlier by the decomposing period of the first sequence. Should the amount of the second supply be smaller than this value, the above-described merit remains in that the amount of created acetic acid in the decomposing period of the second sequence will be small. However, the number of times of the supply and decomposing periods will be set high so as to repeat operation of carbonization required for the entirety of the amount, so that the efficiency will be lower. Note that pores in the carbonized material 31 are created by fine bubbles upon production of acetic acid in the decomposing period for the first sequence. The bubbles can be created only very finely unlike the considerable size of bubbles created in the method of carbonization at one time with the entirety of the chips 63.

The molten cellulose acylate is spread in the pores by the second supply, so the carbonized material 31 is permeated with the molten cellulose acylate of the second supply, the carbonized material 31 being a batch as a result of the decomposing period of the first sequence. The permeated state means that at least a portion of an exposed surface in the pores of the carbonized material 31 contacts the molten cellulose acylate. The pores can be filled with or only charged with the molten cellulose acylate. Thus, a state with gas partially remaining in the pores is also included in the permeated state. It is preferable particularly to fill the pores with the molten cellulose acylate. Note that if a height of the melt of the cellulose acylate is over a level of an upper surface of the batch of the carbonized material 31 created in the decomposing period of the first sequence, an amount of created acetic acid will be higher in the decomposing period of the second sequence. Thus, the height of the melt is preferably flush with or lower than the level of the upper surface.

The chips 63 of the second supply are carbonized after the supply period of the second sequence. When the carbonized material 31 formed from the decomposing period of the first sequence is permeated with melt of cellulose acylate, then the carbonized material 31 becomes broken and contacted by the molten cellulose acylate. In application of heat, the chips 63 of the second supply are carbonized. The part of the carbonized material 31, which has been formed from the first supply and contacts the chips 63 of the second supply, is made harder than at the start of the decomposing period of the second sequence owing to the increase in the ratio of the carbon. In FIG. 4C, a broken line L1 indicates a level of the carbonized material 31 obtained in the decomposing period of the first sequence. A broken line L2 indicates a level of the carbonized material 31 obtained in the decomposing period of the second sequence. Note that in FIGS. 4A-4C, the carbonized material 31 obtained in the decomposing period of the second sequence is positioned over that obtained in the decomposing period of the first sequence. However, part of the carbonized material 31 newly produced in the decomposing period of the second sequence is included in the carbonized material 31 obtained in the decomposing period of the first sequence. In FIG. 3, the mixer 74 is shiftable up and down. In the decomposing period of the second sequence, the mixer 74 should be adjusted and positioned to rotate within the carbonized material 31 formed from the first supply in addition to that formed from the second supply.

The supply period of the third sequence is started before the acetic acid density in the pyrolysis gas 27 in the decomposing period of the second sequence decreases to zero, which is in the same manner as the supply period of the second sequence. An amount of new part of the chips 63 in the supply period of the third sequence is determined so much as to be permeated with molten cellulose acylate upon decomposing the carbonized material 31 obtained by the decomposing period of the second sequence. Note that this is the smallest required amount. The new part of the chips 63 should be preferably so much as to permeate all of the obtained part of the carbonized material 31 with molten cellulose acylate. Apart of the carbonized material 31 between the levels L1 and L2 is preferably contacted by the cellulose acylate molten in the decomposing period of the third sequence. A total of the carbonized material 31 of the level L2 or lower is preferably contacted by the cellulose acylate molten in the decomposing period of the third sequence. The mixer 74 of FIG. 3 is preferably disposed so as to rotate in the carbonized material 31 of the level L2 or lower, namely in at least a part of the carbonized material 31 created according to the second supply.

Thus, the carbonized material 31 upon being produced is permeated with the cellulose acylate molten in the decomposing period of a succeeding sequence, and consolidates so as to raise hardness of the carbonized material 31 or the activated carbon 22. It is preferable to repeat a sequence including the supply and decomposing periods. In relation to the chips 63 in the supply period, a supply amount of those increases gradually until the supply period of the second and third sequences, but comes to remain constant, and then deceases gradually in the supply period of the two or three final sequences. The degree of the gradual increase or decrease in the number of times of supply in the supply period may change according to the capacity and other characteristics of the heating furnace for carbonization. It is preferable to terminate the decomposing period of a final sequence after peaking of the acetic acid density. The end time of the decomposing period can be determined according to the acetic acid density and temperature of the heating furnace.

In heating of the chips 63 in the decomposing period, the inner temperature of the heating furnace 71 is adjusted by the heater/cooler 72 in a range equal to or higher than 300 deg. C., preferably in a range equal to or higher than 350 deg. C. and equal to or lower than 600 deg. C., and desirably in a range equal to or higher than 400 deg. C. and equal to or lower than 600 deg. C. The time of the decomposing period is preferably equal to or more than 15 minutes and equal to or less than 60 minutes. The inner temperature of the heating furnace 71 and the amount of the chips 63 in the supply period can be adjusted for starting the supply period of a succeeding sequence. Should the time be shorter than 15 minutes for carbonization, the decomposition will be too quick and cause bubbles to emerge through the exit opening 77 of the heating furnace 71. Should the time be longer than 60 minutes for carbonization, the productivity will be considerably low.

The carbonized material 31, immediately after the carbonization of all of the amount, is in a temperature range of 300-600 deg. C. The carbonized material 31 at this time has a firmly solid form. Thus, the carbonized material 31 is cooled in a state positioned within the heating furnace 71, before the furnace bottom 71b is removed. The carbonized material 31 is crushed by access through a lower side of the heating furnace 71, and removed.

The pulverizer 68 includes a pulverizing mill and a classifier. The pulverizing mill pulverizes the carbonized material 31. The classifier classifies granules after pulverization of the carbonized material 31 for values of granule diameters. The pulverizing mill pulverizes the carbonized material 31 for a diameter equal to or less than a predetermined value. An average diameter of the pulverized granules of the carbonized material 31 is in a range equal to or more than 2 mm and equal to or less than 20 mm, preferably in a range of 2-15 mm, and desirably in a range of 2-10 mm. As a result of the pulverization, a mixture of granules with different diameters is obtained. In other words, the distribution of the granule diameter is large. It is preferable to classify the granules for each of plural ranges of the diameter. This is because there are suitable diameters of granules of the activated carbon 22 in compliance with its use and purpose. The classifier includes plural filters. A second one of the filters, which is disposed downstream from a first one of those, has numerous pores with a finer size than the first filter. The carbonized material 31 is classified by the plural ranges of the granule diameter.

Note that granules may be classified after the activating step, but preferably can be classified before the activating step, or both before and after the activating step. This is because the activation is effective and efficient according to the smallness of the distribution of the granule diameter.

It is possible in the invention to form the granular activated carbon at a desired high hardness without use of binder but with high resistance to solvent and high resistance to heat, and with very small influence to the environment. Activated carbon of a granule diameter suitable for specific use can be formed easily. The producing method of the invention is advantageous over known methods of producing the granular activated carbon in view of efficiency, because it is unnecessary to use a granulation step for binding the powdered activated carbon with binder as additive. In the invention, the activated carbon can be produced from the cellulose acylate which has been discarded industrially.

The pyrolysis gas 27 drawn from the carbonizer 62 in the embodiment is processed in a gas processor (not shown) for the purpose of safe discharge in the atmosphere. The gas processor includes a burner assembly 81 and a first heat exchanger 82. The burner assembly 81 burns acetic acid, so as to produce a combusted gas 42. The first heat exchanger 82 cools the combusted gas 42 from the burner assembly 81. If iodine has been contained in the chips 63, the combusted gas 42 contains components of iodine and iodine oxides. A washer 83 is preferably used for washing the combusted gas 42 from the first heat exchanger 82. The washer 83 contains absorption solution for absorbing iodine or iodine oxides included in the combusted gas 42. A second heat exchanger 85 is preferably used for cooling exhaust gas 28 from the washer 83 and gaseous carbon dioxide from the burner assembly 81. Also, a remover is preferably disposed downstream from the second heat exchanger 85 for adsorption or absorption of iodine or iodine oxides of a trace amount for removal.

The burner assembly 81 includes a combustion tower and a burner. The combustion tower is supplied with the pyrolysis gas 27 and burns the same. The burner is an auxiliary heat source for raising speed of burning the pyrolysis gas 27. Acetic acid is burnt at a temperature equal to or higher than 850 deg. C. and equal to or lower than 1,000 deg. C. upon supply of the pyrolysis gas 27. In the burning step, the acetic acid is oxidated sufficiently to produce gaseous carbon dioxide. In presence of iodine, iodine ion, iodine oxide as iodine components, oxidation of the components in the pyrolysis gas 27 also proceeds under the condition of oxidating the acetic acid in the above range of the temperature. Note that other substances are likely to be contained in the pyrolysis gas 27. Such substances, in case of containing carbon, react to produce gaseous carbon dioxide.

As the temperature of the combusted gas 42, which contains the gaseous carbon dioxide and iodine components, is 850-1,000 deg. C., the combusted gas 42 is cooled by the first heat exchanger 82 down to such a low temperature so as to enter the washer 83 in a normal condition.

The washer 83 includes a container (not shown), a first pipe (not shown) and a second pipe (not shown). The container contains absorption solution for absorbing gaseous carbon dioxide and iodine components. The first pipe draws the combusted gas 42 to flow in the absorption solution in the container. The second pipe has a distal end positioned higher than a liquid surface in the container, and draws gas inside the container to flow to the outside of the washer 83. The first pipe has one end positioned in the absorption solution. The combusted gas 42 from the first heat exchanger 82 is drawn by the first pipe and bubbled in the absorption solution. Thus, the absorption solution is caused to absorb gaseous carbon dioxide and iodine components as components in the combusted gas 42. Preferable examples of the absorption solutions are an aqueous solution of sodium hydroxide, aqueous solution of potassium hydroxide and other alkaline aqueous solution well-known in the art.

In another preferred washing process, a scrubber well-known in the art is used in place of the liquid bath. An example of the scrubber is an absorption tower, which includes a gas inlet and a shower. The gas inlet is supplied with the combusted gas 42 at a suitable flow rate. The shower is disposed higher than the gas inlet, and supplies absorption solution as droplets.

The combusted gas 42 is cleaned by absorption of the gaseous carbon dioxide and iodine components, so that the exhaust gas 28 is obtained and discharged in the atmosphere. Also, the second heat exchanger 85 is supplied with the exhaust gas 28. Heat exchange is carried out with the exhaust gas 28 and a heat exchange medium or fluid in the second heat exchanger 85 for effectively utilizing heat energy derived from the combusted gas 42.

Figure 5:
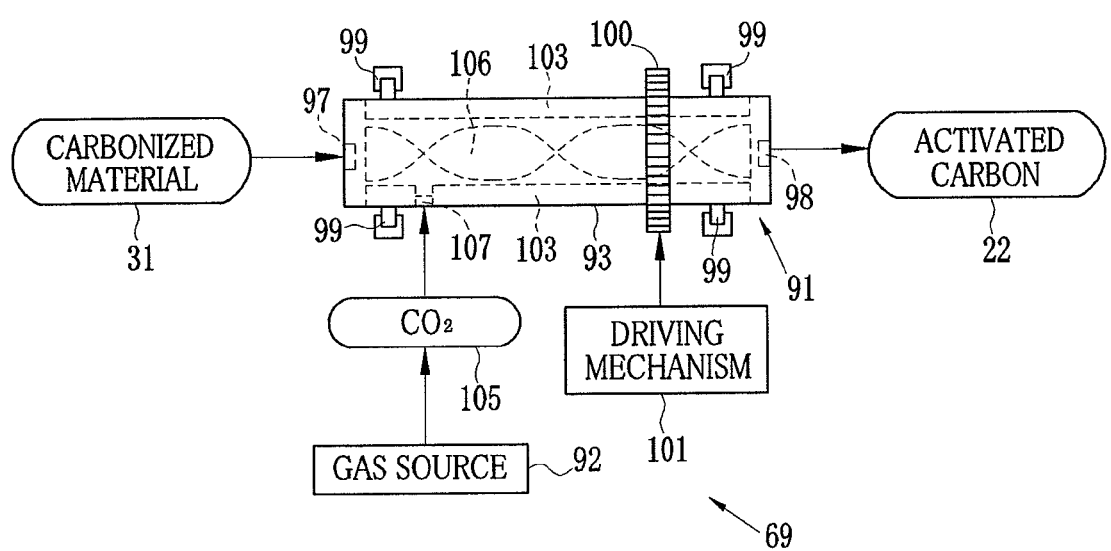
FIG. 5 is an explanatory view illustrating an activation device.

In FIG. 5, the activation device 69 is schematically illustrated. The activation device 69 includes a rotary kiln 91 and a gas source 92 for supplying gaseous medium into the rotary kiln 91. A kiln body 93 of the rotary kiln 91 has a pipe shape which is circular as viewed in the section. An inlet of the kiln body 93 receives the carbonized material 31. An outlet of the kiln body 93 causes the activated carbon 22 to exit. Shutters 97 and 98 are disposed to open and shut respectively the inlet and outlet. For the activation, the shutters 97 and 98 shut the inlet and outlet to enclose the inside of the rotary kiln 91 tightly.

Rollers 99 are disposed to support the kiln body 93 in a rotatable manner about its axis. A sprocket wheel 100 is disposed to project from the kiln body 93. A driving mechanism 101 is in mesh with the sprocket wheel 100 to rotate the kiln body 93. Mixing blades 106 are secured to the inside of the kiln body 93, and caused to rotate to stir the carbonized material 31 during flow in the downstream direction.

An electric heater 103 is disposed in the kiln body 93 to heat its inner space. A temperature sensor (not shown) is disposed in the kiln body 93 and detects its inner temperature. A controller (not shown) is disposed outside the kiln body 93, and controls the temperature according to the detected result of the temperature sensor.

The activation device 69 activates the carbonized material 31, and forms numerous fine pores to enlarge a total of a surface area of the carbonized material 31 over that before the activation. When the carbonized material 31 enters the kiln body 93, the mixing blades 106 rotate in the kiln body 93 and stir the carbonized material 31. An inner space of the kiln body 93 is heated by the electric heater 103, to apply heat to the carbonized material 31 at a predetermined level of the temperature.

In the kiln body 93, the temperature of the carbonized material 31 is preferably in a range equal to or higher than 750 deg. C. and equal to or lower than 950 deg. C. If the inner temperature of the kiln body 93 is regarded as the temperature of the carbonized material 31, the electric heater 103 can be adjusted for the temperature to control the inner temperature in this range. In the activating step with the kiln body 93, the carbonized material 31 is oxidated. Specifically, atoms or groups of atoms other than carbon atoms in the carbonized material 31 are oxidated and removed. Also, part of carbon atoms in the carbonized material 31 is oxidated and removed in forms of carbon dioxide or carbon monoxide. This forms fine pores in the carbonized material 31 with a small diameter, to obtain the activated carbon 22.

As the activating step is endothermic reaction which absorbs heat, necessary time is longer according to smallness in the heat energy per unit time for the purpose of applying predetermined heat energy to the carbonized material 31. Time for activating the carbonized material 31 is longer according to the lowness of the inner temperature of the kiln body 93. Should the temperature of the carbonized material 31 be lower than 750 deg. C., no activation occurs, so that the activated carbon 22 with adsorptivity cannot be obtained. Should the temperature of the carbonized material 31 be higher than 950 deg. C., a manufacturing cost of the rotary kiln 91 will be extremely high. Among carbon atoms contained in the carbonized material 31, the number of carbon atoms to be removed in the oxidated form of carbon dioxide, carbon monoxide or the like may be too great. The yield of the activated carbon 22 will be lower according to the highness in the number of the carbon atoms to be removed. This being so, a suitable range of the temperature of the carbonized material 31 in the kiln body 93 is determined as described above.

Gaseous carbon dioxide 105 ($CO_2$) from the gas source 92 flows through a supply opening 107 or gas conduit into the kiln body 93. An amount of the gaseous carbon dioxide to supply depends upon the amount of the carbonized material 31. In other words, an amount of the gaseous carbon dioxide is higher according to highness of the amount of the carbonized material 31. Feeding of the gaseous carbon dioxide can be at the start of the activation, or throughout the period of the activation, or continually during the activation. The gas for the kiln body 93 is not limited to carbon dioxide, and can be oxidant gas which oxidates the carbonized material 31 by means of reduction of itself. Examples of oxidant gases include carbon dioxide, steam, air and the like and mixture of two or more of those.

Time of activation is adjusted so as to set the yield of the activated carbon 22 at 50%. The yield (%) of the activated carbon 22 is defined as 100×B/A where A is a weight of the carbonized material 31 for the activation, and B is a weight of the activated carbon obtained by the activation. Also, the time of activation can be adjusted also by performance of heating of the electric heater 103 and a rotational speed of the kiln body 93.

Activation of the carbonized material 31 in the activation device 69 removes unwanted extremely fine particles. The activated carbon 22 can have a very large surface area with the numerous fine pores. Adsorptivity of the activated carbon 22 is much higher than that of the carbonized material 31. As the carbonized material 31 is activated while stirred by the rotary kiln 91, the activated carbon 22 can be produced efficiently even with adsorptivity at a near level to that of well-known coconut shell activated carbon. After the activation, the shutter 98 in the kiln body 93 is opened to discharge the activated carbon 22. Note that the shutter 97 can be opened in the kiln body 93 for new supply of the carbonized material 31 for next operation.

In the present embodiment, the rotary kiln 91 is used for stirring the carbonized material 31 in the course of activation. However, other structures can be used for obtaining efficiency in the thermal conduction to the carbonized material 31 and its contact with the gaseous carbon dioxide 105. For example, gaseous oxidant can be blown into a container containing the carbonized material 31 for stir with the gas flow. Also, the container may be vibrated or shaken to stir the carbonized material 31.

According to the measurement of the above-described method, adsorptivity for dichloromethane according to JIS K1474 is approximately 0.6 g/g. There occurs no degradation due to desorption with steam in the adsorption device in the solution casting system, and no degradation due to solvent. Note that the value of the adsorptivity is in a weight (g) of the dichloromethane adsorbed per one gram of the activated carbon.

The gas created in the above-described carbonization is gaseous acetic acid. This is because acetyl cellulose is contained as cellulose acylate in the first and second cellulose acylate layers in the multi-layer waste film 17 of FIG. 1. If acyl groups other than the acetyl group are contained in the cellulose acylate, a carboxylic acid other than the acetic acid may be created in place of or in addition to the acetic acid, for example, propionic acid and butyric acid.

Note that the state of the cellulose acylate as carbonaceous raw material for activated carbon is not limited to the chip form. Examples of other forms of the cellulose acylate are a granular form, powdered form and the like of a dry state, which may be a component recovered in producing the polymer dope as a loss, and also forms of pieces, blocks or the like. Activated carbon can be produced from various waste materials of polarizing plates and intermediate products discarded in producing the polarizing plates.

EXAMPLES

Examples of the invention are hereafter described. Experiments were conducted for Examples 1 and 2, together with Comparative Examples 1 and 2 and Reference Example.

Comparative Example 1

The single layer waste film of cellulose acylate was cut by a rotary cutter to form chips of a size of approximately 1 cm×1 cm. Activated carbon was produced from the chips in the following condition. In the carbonization, all of the chips were fed in the heating furnace 71 and carbonized at one time together. The inner temperature of the heating furnace 71 was equal to or higher than 350 deg. C. and equal to or lower than 600 deg. C. Time of heating was 15 minutes. In the activating step 37, heat was applied at 900 deg. C. for 90 minutes. The activation device 69 was supplied by the gas source 92 with the gaseous carbon dioxide 105. A flow rate of the gaseous carbon dioxide 105 was 1 liter per minute. A rotational speed of the mixing blades 106 in the activation device 69 was 0.75 rpm.

For the activated carbon, evaluation was carried out for the resistance to weight, resistance to steam, adsorptivity for iodine, and adsorptivity for dichloromethane. The resistance to weight is degree of hardness of granules of the activated carbon. The resistance to steam is degree of low degradation in relation to hardness of granules of the activated carbon upon desorption of steam. Details of methods of the evaluation are as follows.

a. Resistance to weight. Granules with a constant diameter were sampled from the obtained activated carbon. The sampled granules were spread thickly on the glass plate and with an area of 1 sq. cm. A stainless plate with an area of 1 sq. cm was placed on the spread granules. A weight was placed on the stainless plate for one (1) minute. A state of the collapse of the sampled granules was observed with eyes. The resistance was graded as "Good" when the weight ratio of the collapsed granules was equal to or more than 0% and equal to or less than 10%, and was graded as "Poor" when this ratio was more than 10%. A maximum value of the mass of the placed weight with the evaluation of "Good" was obtained, and used as a result of the evaluation.

b. Resistance to steam. Approximately 15 grams of granules with a constant diameter were sampled from the obtained activated carbon. The sampled granules were placed in a box-shaped container formed from filter paper with permeability to water. Steam was blown to the sampled granules for 30 minutes sufficiently with adjustment of the amount of the steam, in keeping the sampled granules from scattering. After the blow, appearance of the sampled granules was observed with eyes. The resistance was graded as "Good" when the weight ratio of the more finely collapsed granules was less than 50%, and was graded as "Poor" when this ratio was equal to or more than 50%.

c. Adsorptivity for iodine. Measured according to the method of JIS K1474. The measured value was a weight (mg) of the adsorbed iodine per one (1) gram of the activated carbon.

d. Adsorptivity for dichloromethane. Measured according to the method of JIS K1474. The measured value was a weight (mg) of the adsorbed dichloromethane per one (1) gram of the activated carbon.

Note that activated carbon having been subjected to adsorption and desorption with steam was also evaluated for the resistance to weight and adsorptivity. To this end, the activated carbon was dried for one (1) hour at 150 deg. C. and evaluated in the evaluation methods a, c and d.

Results of evaluation of the activated carbon obtained by Comparative Example 1 are indicated in Table 1. The term of the single layer film is used for the single layer waste film in Table 1. The number of sequences of the carbonization means the number of times of repetition of the supply and decomposing steps. When all of the chips are supplied in the heating furnace and carbonized at one time in the Comparative Example 1, then "1 time" is indicated for the number of the times of the carbonization. Signs a, b, c and d in Table 1 correspond to the above-described evaluation methods. For the Comparative Example 1, the activated carbon was granules with an average diameter of 200-300 microns, so that resistance to weight (a) was not measured. The sign for none is indicated in Table 1. In relation to steam (b), no change in the appearance due to steam was found in the Comparative Example 1. The sign for none is indicated in Table 1, as this result was out of consideration in relation to comparison with the present invention. In Table 1, handlability is also indicated.

Activated carbon obtained from Comparative Example 1 was in the powdered form. There occurred scattering of the activated carbon in containment in the adsorption device. The state of containing the activated carbon was very tight in a chamber in the adsorption device without remarkable gap owing to the powdered form. A contact area of gaseous solvent to be adsorbed was small in comparison with that according to granular activated carbon. When desorption was carried out by use of steam, pressure in the chamber was increased, to bleed a part of the activated carbon from the chamber. This was evaluated as Poor for handlability in Table 1.

Example 1

Activated carbon production of the Comparative Example 1 was repeated except for the following. In the carbonizing step 32, the chips 63 were split in 10 groups, and were carbonized by carrying out 10 sequences of the supply and decomposing periods. An inner temperature of the rotary kiln 91 in the decomposing period was commonly set equal to or higher than 350 deg. C. and equal to or lower than 600 deg. C. A length of the decomposing period was 15 minutes. The condition of the activating step 37 in the Comparative Example 1 was repeated. Thus, granular activated carbon with an average granule diameter of 5 mm was produced.

The activated carbon 22 from the Example 1 was evaluated in the evaluation methods a, b, c and d in a manner similar to the Comparative Example 1. The results are indicated in Table 1. Note that the handlability of the activated carbon obtained by the Example 1 was good unlike the poor handlability of the powdered activated carbon in the Comparative Example 1, because the activated carbon of the Example 1 was granular. It was possible to contain the activated carbon in the adsorption device and to carry out the adsorption and desorption acceptably. Evaluation of the "handlability" in Table 1 was Good.

Comparative Example 2

The Comparative Example 1 was repeated with a difference in that powdered activated carbon was processed with binder to produce granules with an average granule diameter of 5 mm. The binder was cornstarch. The activated carbon 22 was evaluated according to the evaluation methods a-d. A result of the evaluation is indicated in Table 1. The activated carbon 22 obtained in Example 2 was granular. Handlability of the activated carbon 22 was found good. As the cornstarch was used as binder, unwanted influence to the environment was supposed to be small.

Example 2

Example 1 was repeated with a difference in that the multi-layer waste film 17 was used in place of the single layer waste film. The activated carbon 22 was produced from the multi-layer waste film 17 at an average granule diameter of 5 mm. The multi-layer waste film 17 was a waste material of a polarizing plate. The activated carbon 22 was evaluated according to the evaluation methods a-d. The activated carbon 22 obtained in Example 2 was granular. Handlability of the activated carbon 22 was found good, which is indicated in Table 1.

Reference Example

The Comparative Example 1 was repeated with a difference in that coconut shell activated carbon of a commercially available type was used, with a trade name of Shirasagi, produced by Takeda Pharmaceutical Co., Ltd. The activated carbon was evaluated according to the evaluation methods a-d. A result of the evaluation is indicated in Table 1. The coconut shell activated carbon was granular. Its handlability was found good. However, petroleum pitch was used as binder in the coconut shell activated carbon, which should be regarded as unwanted with influence to the environment.

TABLE 1

| | Comparative Example 1 | Example 1 | Comparative Example 2 |
|---|---|---|---|
| Raw material | Single layer film | Single layer film | Single layer film |
| No. of sequences of carbonization | 1 | 10 | — |
| State of activated carbon | Powdered | Granular | Granular (*1) |
| Handlability | Poor | Good | Good |
| Evaluation a, Resistance to weight (kg per sq. cm) | — | 5 | 5 |
| b, Resistance to steam | — | Good | Poor |
| c, Adsorptivity for iodine (mg) | 1,100 | 1,100 | 1,040 |
| d, Adsorptivity for dichloromethane (g) | 0.61 | 0.62 | 0.53 |

TABLE 1-continued

| | Example 2 | Reference Example |
|---|---|---|
| Raw material | Multi-layer film | Coconut shell |
| No. of sequences of carbonization | 10 | — |
| State of activated carbon | Granular | Granular (*2) |
| Handlability | Good | Good |
| Evaluation a, Resistance to weight (kg per sq. cm) | 5 | 5 |
| b, Resistance to steam | Good | Good |
| c, Adsorptivity for iodine (mg) | 1,050 | 1,000 |
| d, Adsorptivity for dichloromethane (g) | 0.61 | 0.60 |

Notes.
(*1) Granular form obtained from powdered activated carbon according to the Comparative Example 1 by use of binder.
(*2) Commercially available granular activated carbon obtained from powdered activated carbon by use of binder.

As is observed in Table 1, the activated carbon produced according to the invention can have the adsorptivity equal to or more than that of commercially available coconut shell activated carbon. It is possible to produce the activated carbon with high quality for adsorption by use of cellulose acylate. Film, polarizing plates and the like, which have been discarded in a large scale, can be reused in the form of the activated carbon. Also, the granular activated carbon can be handled easily. The activated carbon of the invention also has high resistance to steam and high resistance to weight in addition to the adsorption. In use of the activated carbon of the invention, influence to the environment can be very small.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An activated carbon producing method comprising:
a carbonizing step, having supply periods and decomposing periods, wherein in a plural number of said supply periods, a cellulose acylate is supplied to a heating furnace, and said decomposing periods are set respectively after said supply periods, for melting and thermally decomposing said cellulose acylate in said heating furnace, to obtain a carbonized material;
a cooling step of cooling said carbonized material;
a pulverizing step of pulverizing said carbonized material to obtain granules; and
an activating step of activating said granules to create activated carbon, by forming fine pores in said granules with heat applied to said granules in presence of gaseous oxidant for oxidating said carbonized material.

2. An activated carbon producing method as defined in claim 1, wherein in said decomposing period of a second sequence or later, said carbonized material produced earlier is permeated with melt of said cellulose acylate.

3. An activated carbon producing method as defined in claim 2, wherein an Nth one of said supply periods is started while gas of a carboxylic acid is created in an (N−1)th one of said decomposing periods, where N is an integer of 2 or more.

4. An activated carbon producing method as defined in claim 3, wherein carboxylic acid density of carboxylic acid present in said heating furnace becomes higher during carbonization;

further comprising a step of, after said decomposing periods of said plural number, detecting said carboxylic acid density in said heating furnace;

when said carboxylic acid density becomes higher than a peak, said carbonizing step is terminated to start said cooling step.

5. An activated carbon producing method as defined in claim 3, wherein said Nth supply period is started when said carboxylic acid density becomes equal to or less than D % of a peak thereof in said (N−1)th decomposing period, and D is equal to or less than 60.

6. An activated carbon producing method as defined in claim 5, wherein said plural number is at least three.

7. An activated carbon producing method as defined in claim 1, wherein in said pulverizing step, said carbonized material is pulverized in a size equal to or more than 2 mm and equal to or less than 20 mm.

8. An activated carbon producing method as defined in claim 1, further comprising a cutting step of cutting film of said cellulose acylate into chips for supply to said heating furnace.

9. An activated carbon producing method as defined in claim 1, wherein temperature of said heating furnace is equal to or higher than 300 deg. C. and equal to or lower than 600 deg. C.

10. An activated carbon producing method as defined in claim 1, wherein in said decomposing period, said cellulose acylate is heated in a duration equal to or more than 15 minutes and equal to or less than 60 minutes.

11. An activated carbon producing method as defined in claim 1, further comprising a classifying step of classifying said granules before said activating step.

* * * * *